(12) United States Patent
Belwafa et al.

(10) Patent No.: US 9,340,176 B2
(45) Date of Patent: May 17, 2016

(54) PASSENGER AIRBAG WITH SECONDARY CHAMBER

(71) Applicant: Ford Global Technologies, LLC, Dearborn, MI (US)

(72) Inventors: Jamel E. Belwafa, Ann Arbor, MI (US); Mohammed Omar Faruque, Ann Arbor, MI (US); James Chih Cheng, Troy, MI (US); Jaeho Cho, Shelby Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/226,904

(22) Filed: Mar. 27, 2014

(65) Prior Publication Data

US 2015/0258959 A1   Sep. 17, 2015

Related U.S. Application Data

(63) Continuation-in-part of application No. 14/209,752, filed on Mar. 13, 2014.

(51) Int. Cl.
*B60R 21/205*   (2011.01)
*B60R 21/233*   (2006.01)
*B60R 21/00*    (2006.01)

(52) U.S. Cl.
CPC ............. *B60R 21/233* (2013.01); *B60R 21/205* (2013.01); *B60R 2021/0009* (2013.01); *B60R 2021/23308* (2013.01); *B60R 2021/23324* (2013.01)

(58) Field of Classification Search
CPC ................ B60R 21/231; B60R 21/233; B60R 2021/23308; B60R 2021/23316
See application file for complete search history.

(56) References Cited

U.S. PATENT DOCUMENTS

| | | | | |
|---|---|---|---|---|
| 3,752,501 | A * | 8/1973 | Daniel et al. | 280/729 |
| 4,262,931 | A * | 4/1981 | Strasser | B60R 21/233 |
| | | | | 280/729 |
| 5,240,283 | A * | 8/1993 | Kishi et al. | 280/729 |
| 5,282,646 | A * | 2/1994 | Melvin et al. | 280/729 |
| 5,529,337 | A * | 6/1996 | Takeda et al. | 280/729 |
| 5,575,497 | A * | 11/1996 | Suyama | B60R 21/231 |
| | | | | 280/730.1 |
| 5,577,765 | A * | 11/1996 | Takeda et al. | 280/729 |
| 5,599,041 | A | 2/1997 | Turnbull et al. | |
| 5,609,363 | A * | 3/1997 | Finelli | B60R 21/231 |
| | | | | 280/730.1 |
| 5,718,450 | A | 2/1998 | Hurford et al. | |
| 5,791,685 | A | 8/1998 | Lachat et al. | |
| 5,906,391 | A * | 5/1999 | Weir et al. | 280/729 |
| 5,927,748 | A | 7/1999 | O'Driscoll | |
| 6,425,602 | B1 | 7/2002 | Al-Amin et al. | |
| 6,439,605 | B2 | 8/2002 | Ariyoshi | |
| 6,517,109 | B1 * | 2/2003 | Van Poppel | 280/743.1 |

(Continued)

FOREIGN PATENT DOCUMENTS

| | | |
|---|---|---|
| JP | 2303951 | 12/1990 |
| JP | 2010-201980 A * | 9/2010 |

*Primary Examiner* — Ruth Ilan

(74) *Attorney, Agent, or Firm* — Frank A. MacKenzie; Bejin Bieneman PLC

(57) ABSTRACT

A vehicle airbag comprises a primary chamber and a secondary chamber affixed to the primary chamber by a seam. A passage is defined between the primary chamber and the secondary chamber. The seam defines a closed shape, and an inner side of the seam is located between sides of the primary chamber, and is between sides of the secondary chamber.

20 Claims, 12 Drawing Sheets

(56) References Cited

U.S. PATENT DOCUMENTS

| | | | |
|---|---|---|---|
| 6,554,313 B2 * | 4/2003 | Uchida | 280/729 |
| 6,786,505 B2 * | 9/2004 | Yoshida | 280/729 |
| 6,971,664 B2 | 12/2005 | Amamori | |
| 7,168,733 B2 | 1/2007 | Kumagai et al. | |
| 7,210,701 B2 * | 5/2007 | Meissner et al. | 280/729 |
| 7,458,605 B2 | 12/2008 | Hasebe et al. | |
| 7,631,891 B2 * | 12/2009 | Washino | 280/731 |
| 7,673,901 B2 | 3/2010 | Hanawa et al. | |
| 7,726,684 B2 | 6/2010 | Breed | |
| 7,922,191 B2 | 4/2011 | Choi | |
| 8,038,169 B2 * | 10/2011 | Rick | B60R 21/206 280/732 |
| 8,408,593 B2 * | 4/2013 | Kuhlmann | 280/732 |
| 8,414,022 B2 * | 4/2013 | Song et al. | 280/732 |
| 2002/0017774 A1 | 2/2002 | Igawa | |
| 2003/0030254 A1 * | 2/2003 | Hasebe | 280/729 |
| 2003/0034637 A1 * | 2/2003 | Wang et al. | 280/729 |
| 2003/0094794 A1 * | 5/2003 | Amamori | B60R 21/231 280/729 |
| 2003/0116945 A1 * | 6/2003 | Abe | B60R 21/231 280/729 |
| 2003/0178831 A1 * | 9/2003 | Roberts | B60R 21/23138 280/743.1 |
| 2004/0056456 A1 | 3/2004 | Ikeda et al. | |
| 2004/0164526 A1 | 8/2004 | Hasebe et al. | |
| 2004/0232681 A1 | 11/2004 | Adomeit | |
| 2005/0098985 A1 * | 5/2005 | Sullivan et al. | 280/729 |
| 2005/0104339 A1 | 5/2005 | Hasebe et al. | |
| 2005/0156411 A1 | 7/2005 | Steffens et al. | |
| 2005/0184489 A1 | 8/2005 | Kobayashi | |
| 2006/0249934 A1 | 11/2006 | Hasebe | |
| 2008/0179867 A1 | 7/2008 | Riedel et al. | |
| 2012/0112441 A1 | 5/2012 | Ohara | |
| 2013/0001934 A1 | 1/2013 | Nagasawa et al. | |
| 2014/0151984 A1 * | 6/2014 | Fukawatase | B60R 21/233 280/730.2 |
| 2015/0158452 A1 * | 6/2015 | Choi | B60R 21/233 280/732 |
| 2015/0175116 A1 * | 6/2015 | Cho | B60R 21/205 280/729 |
| 2015/0298643 A1 * | 10/2015 | Schneider | B60R 21/233 280/729 |

\* cited by examiner

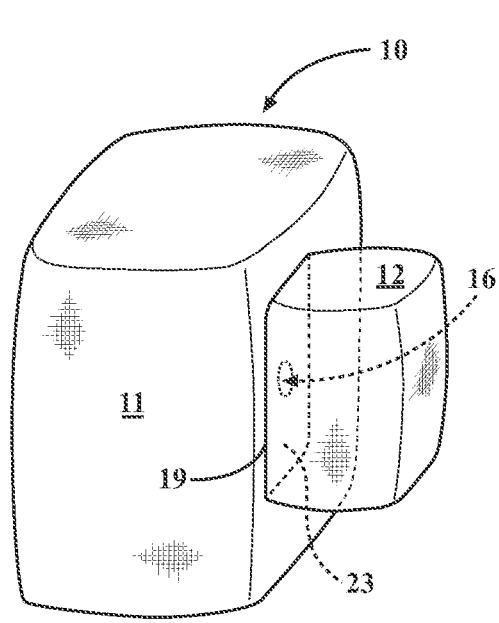
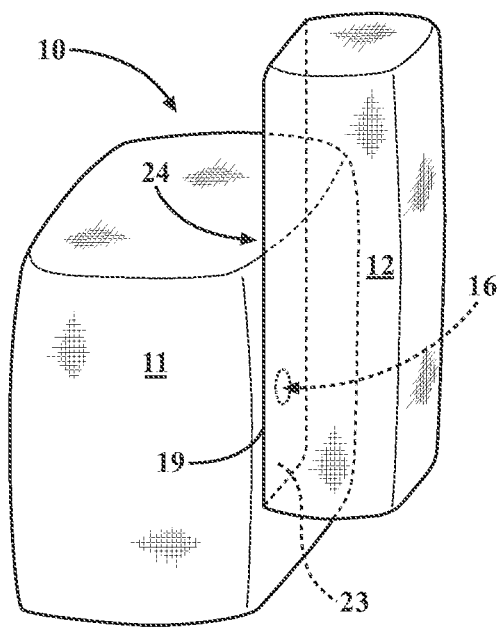
FIG. 7A  FIG. 7B
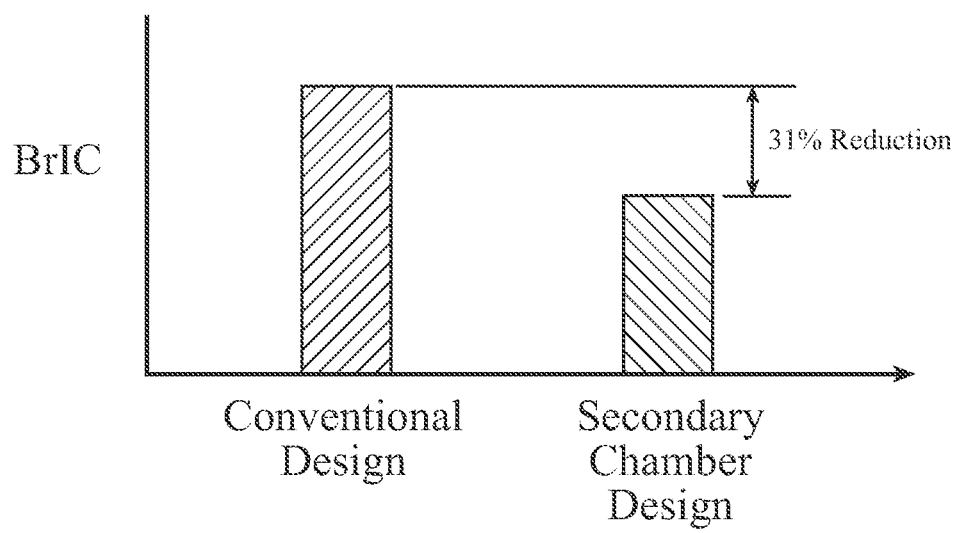
FIG. 8

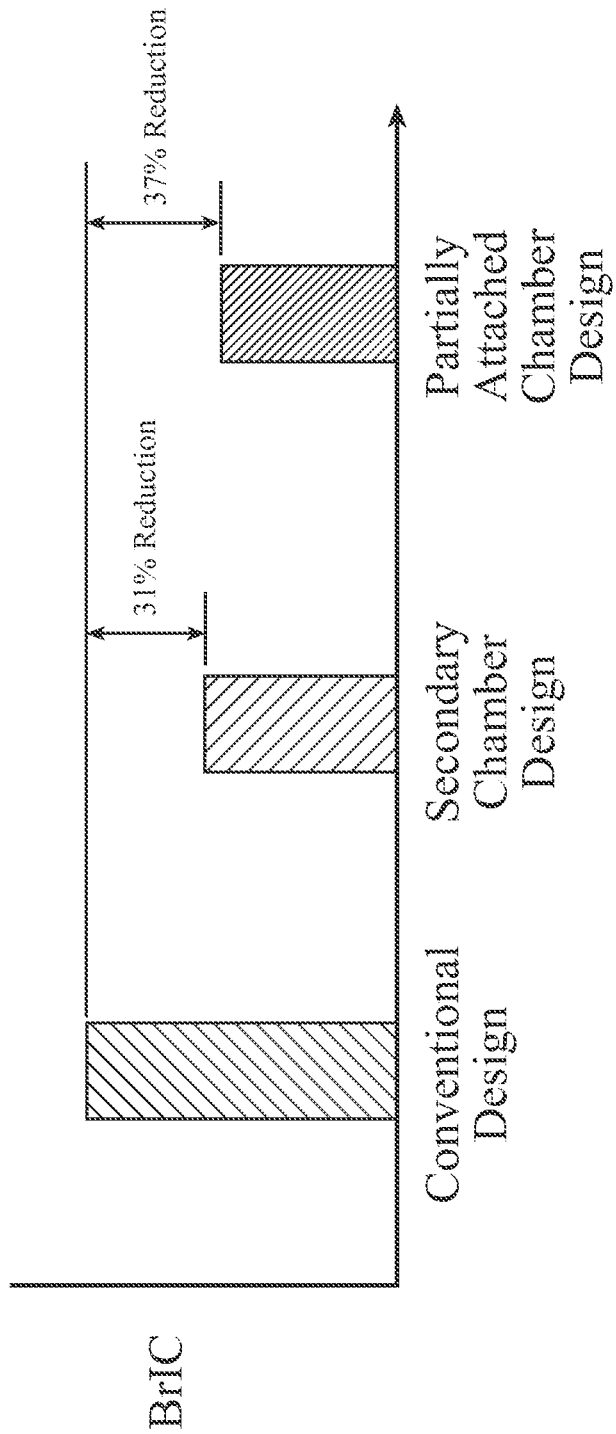

PASSENGER AIRBAG WITH SECONDARY CHAMBER

CROSS-REFERENCE TO RELATED APPLICATION

This application is a continuation-in-part of, and as such claims priority to, U.S. patent application Ser. No. 14/209,752, filed Mar. 13, 2014, entitled "PASSENGER AIRBAG WITH SECONDARY CHAMBER," which application is hereby incorporated herein by reference in its entirety.

BACKGROUND

A potential cause of head injuries in vehicle collisions, particularly when a collision includes an oblique impact, is a rotation of a vehicle occupant's head. For example, vehicles traveling in opposite directions may collide at an angle, striking each other on a driver's side of a target vehicle. In this scenario, an occupant in a passenger-side seat of the target vehicle may experience head rotation, that consequently may induce head injury, as the occupant's head strikes a passenger airbag and rolls toward the driver's side of the vehicle. Present passenger airbags may not be problematic with head rotation in a direct head-on collision. However, present passenger airbags have deficiencies with respect to their ability to minimize head rotation and head injury in oblique collisions.

DRAWINGS

FIGS. 6A-6E provide respective perspective views of exemplary secondary chambers attached to a primary chamber.

FIGS. 7A and 7B are perspective views of respective exemplary airbags 10, illustrating exemplary mechanisms for affixing the secondary chamber 12 to the primary chamber 11.

FIG. 8 provides a graph showing respective Brain Injury Criterion (BrIC) scores for airbags with and without a secondary chamber.

Figure 9:
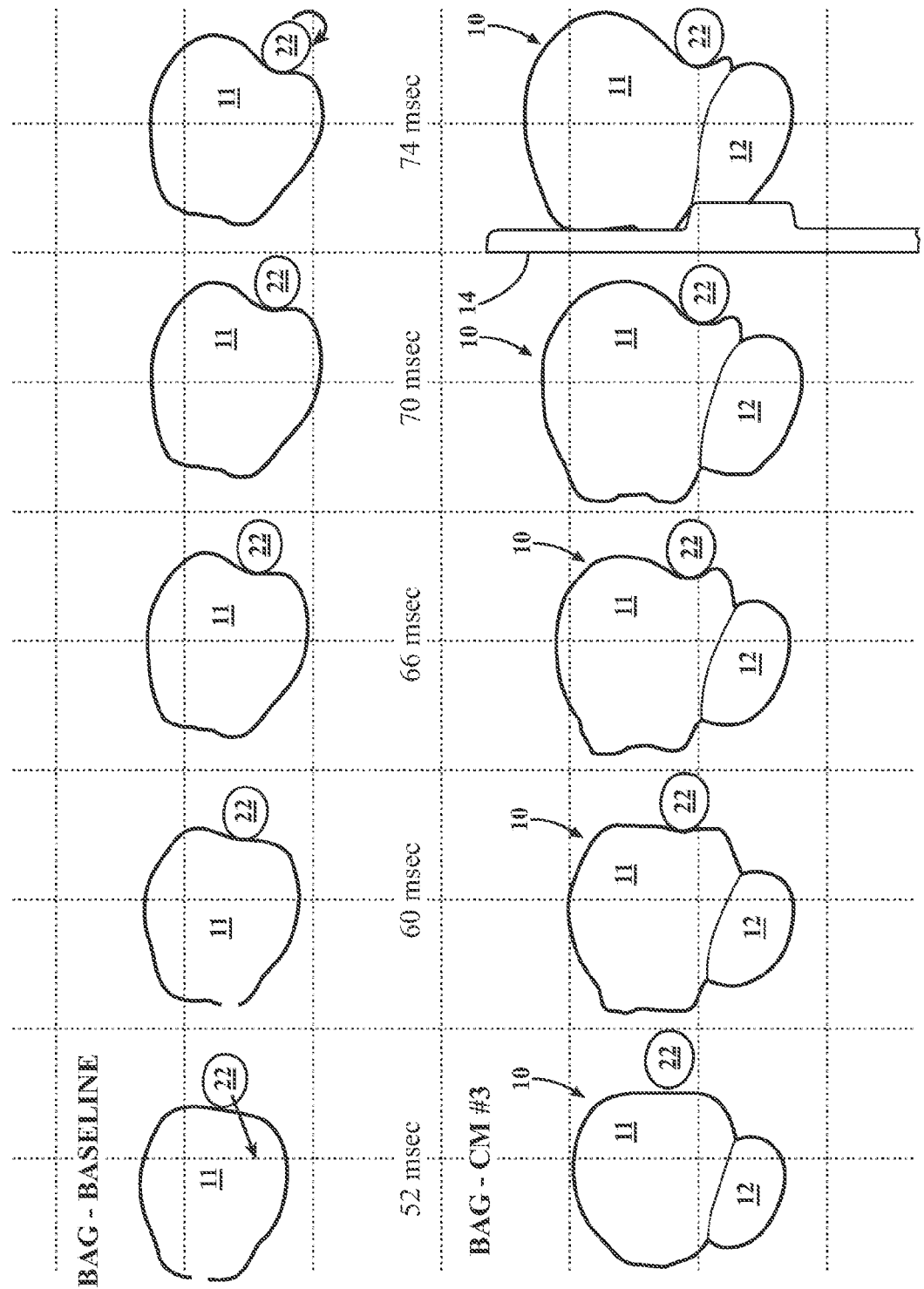

FIG. 9 includes two series of block diagrams representing times-series simulations of a human head striking an airbag.

Figure 10:
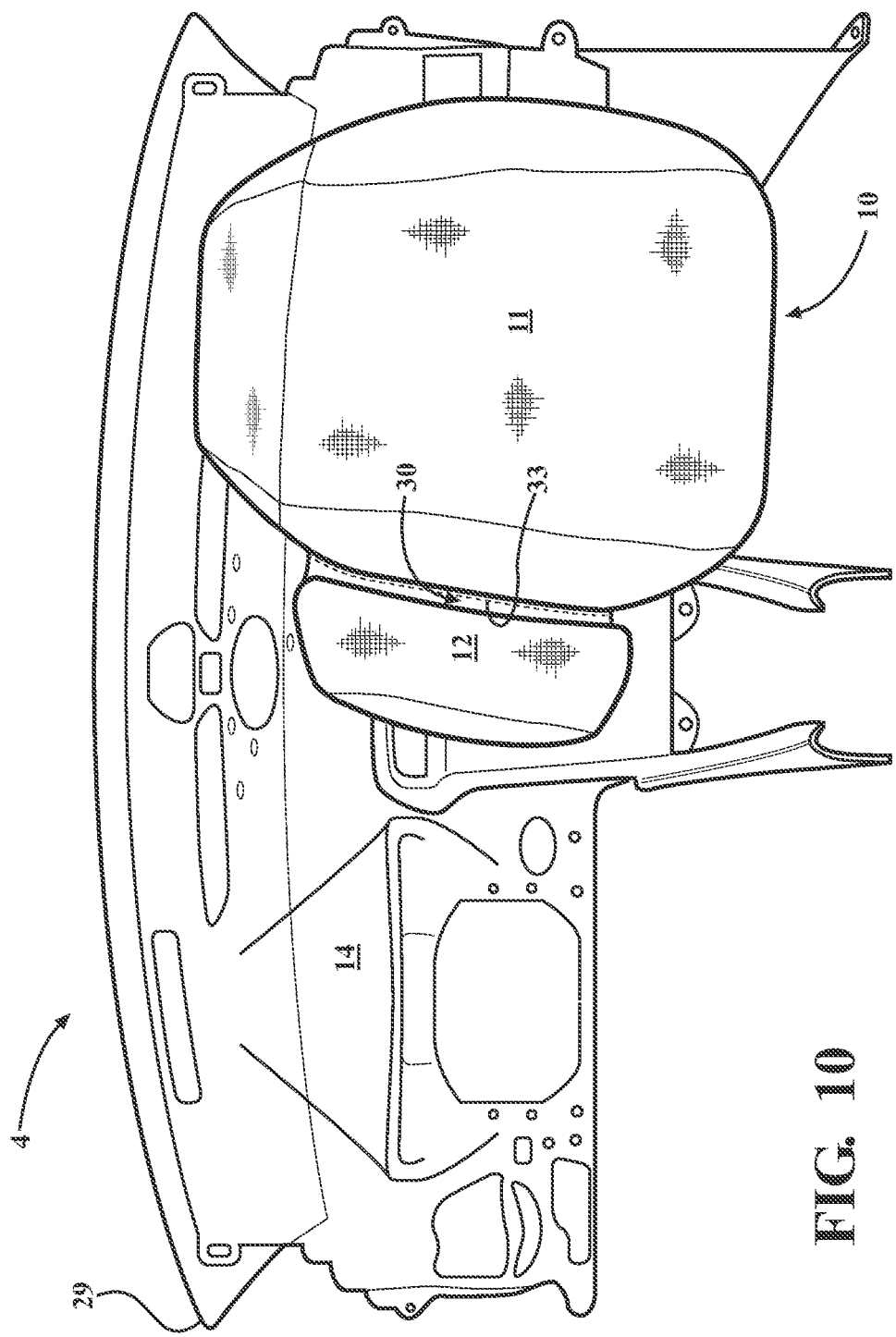

FIG. 10 is a perspective view of a vehicle portion including a further example of a passenger airbag having a primary chamber and a partially attached secondary chamber.

Figure 11:
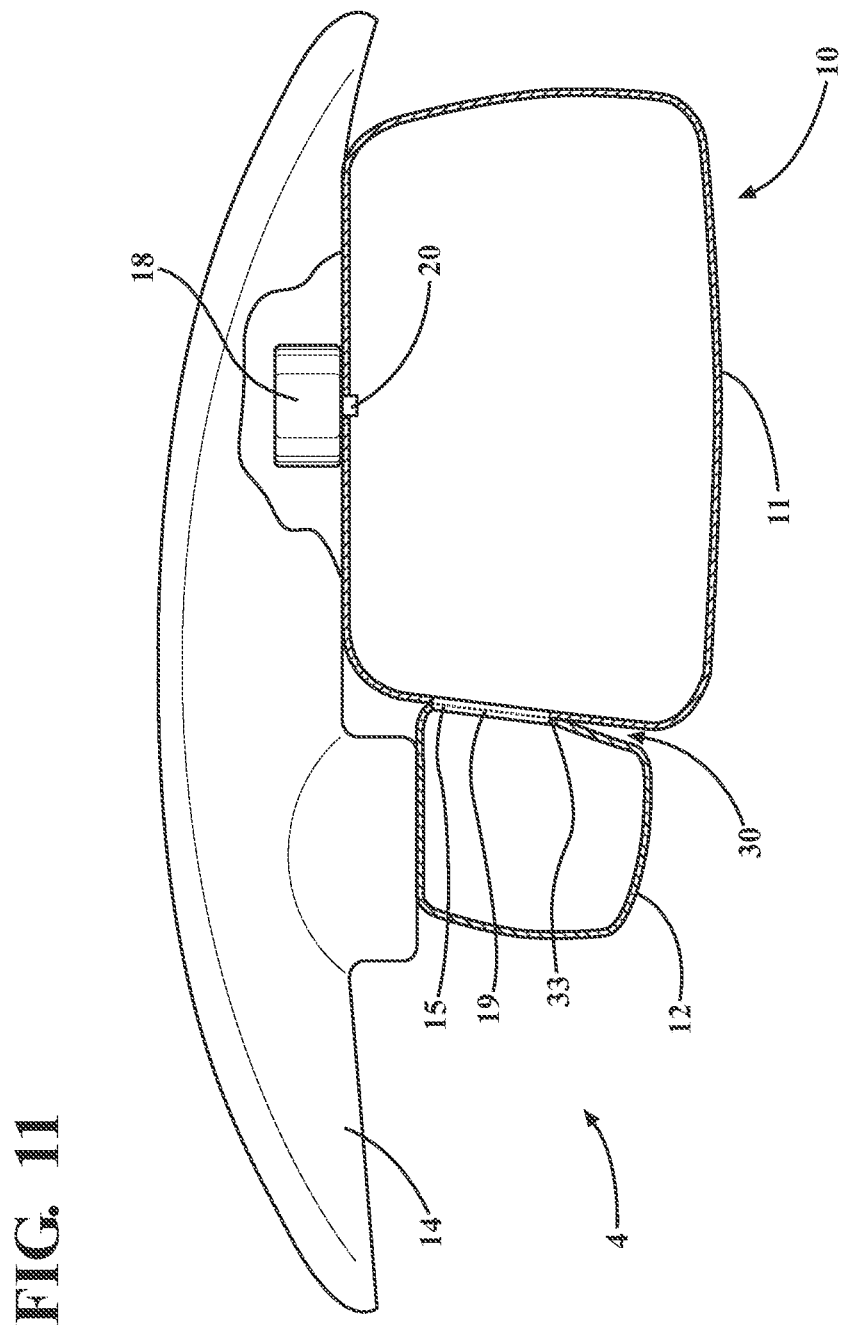

FIG. 11 is a top cross-sectional view of a vehicle portion including the exemplary passenger airbag of FIG. 10, having a primary chamber and a partially attached secondary chamber.

Figure 12A:
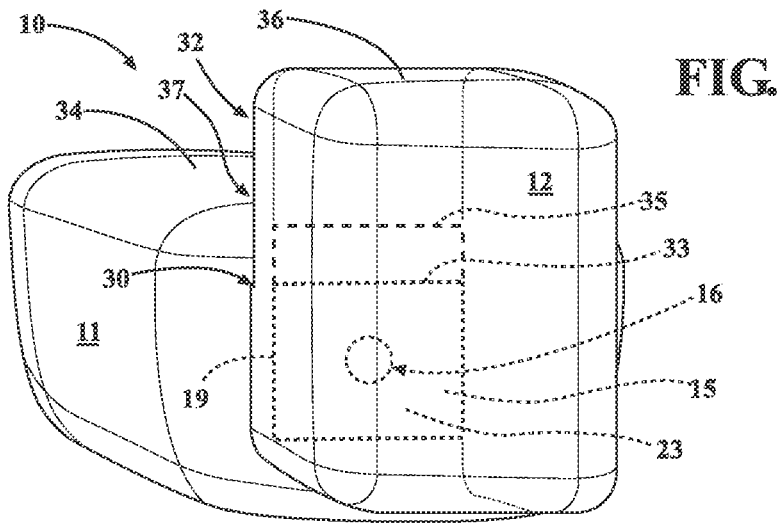
Figure 12B:
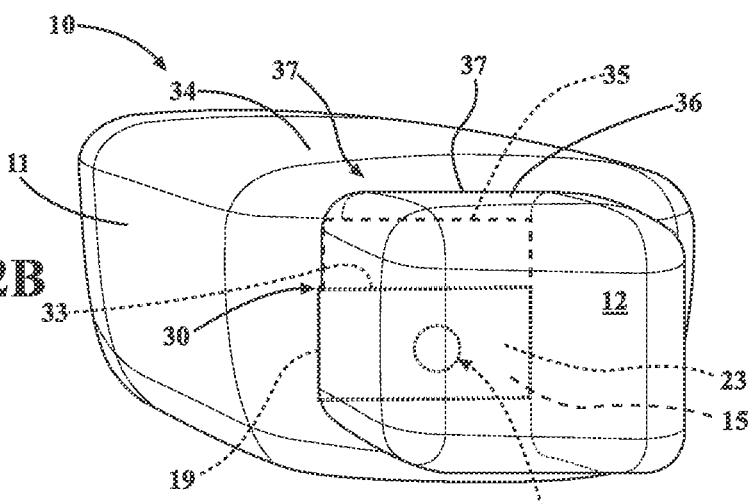
Figure 12C:
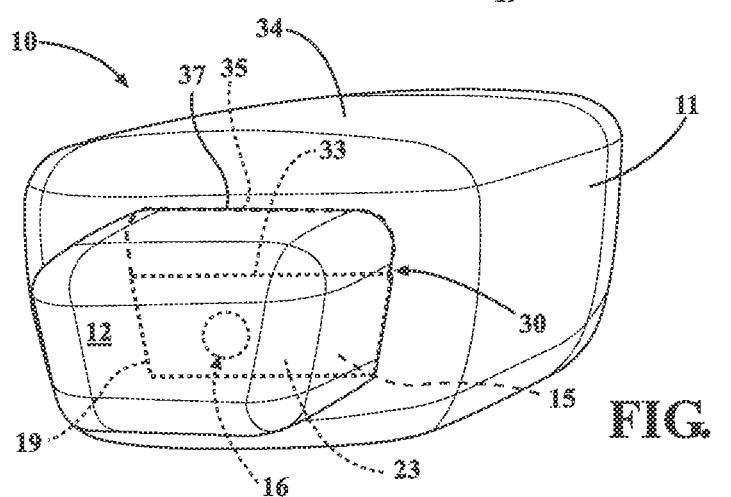

FIGS. 12A-12C provide respective perspective views of the exemplary airbag of FIG. 10, including exemplary secondary chambers partially attached to a primary chamber.

Figure 13:
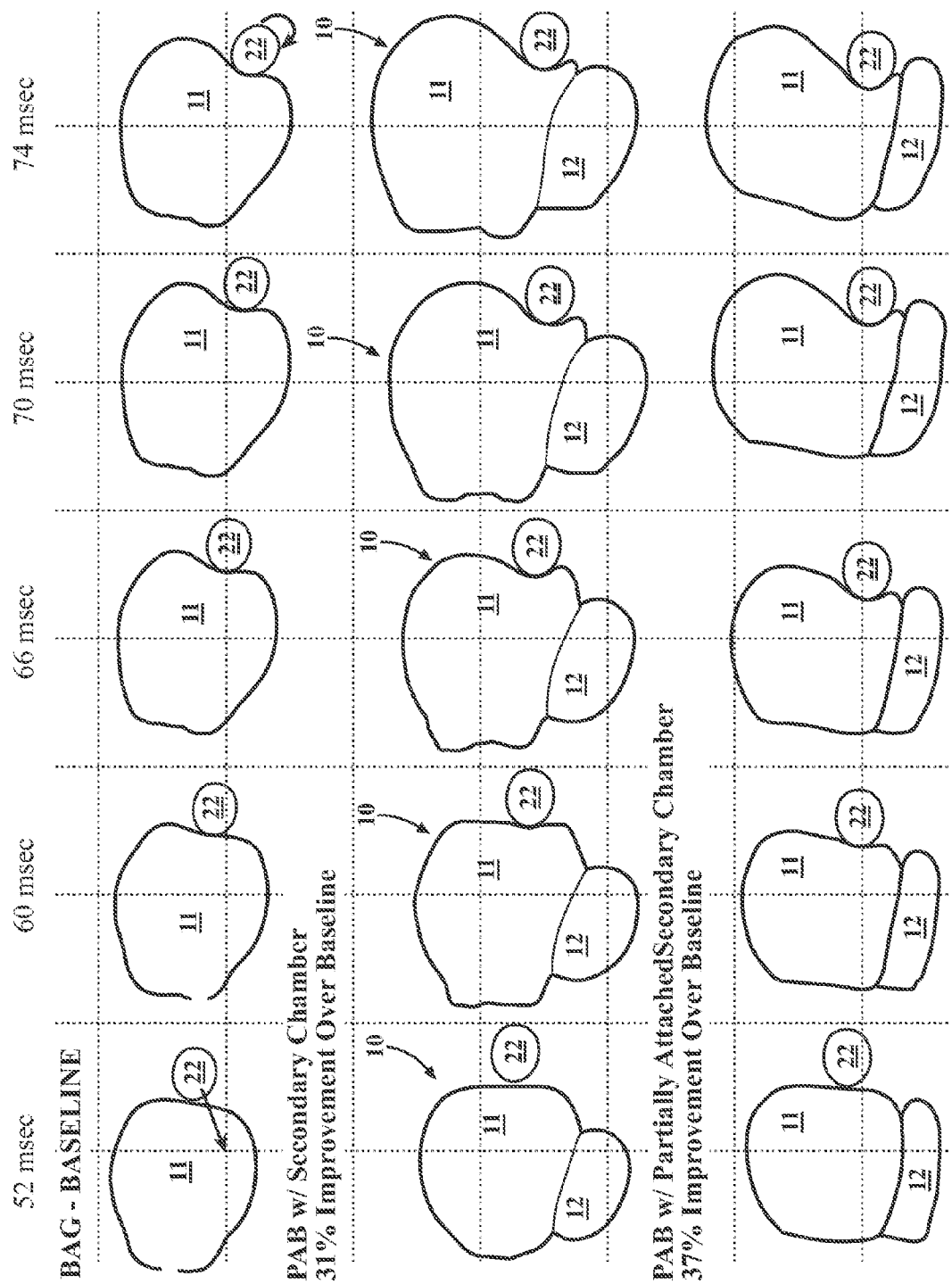

FIG. 13 includes three series of block diagrams representing times-series simulations of a human head striking an airbag.

FIG. 14 provides a graph showing respective Brain Injury Criterion (BrIC) scores for airbags without a secondary chamber, with a secondary chamber that is fully attached, and with a secondary chamber that is partially attached.

DETAILED DESCRIPTION

Figure 1:
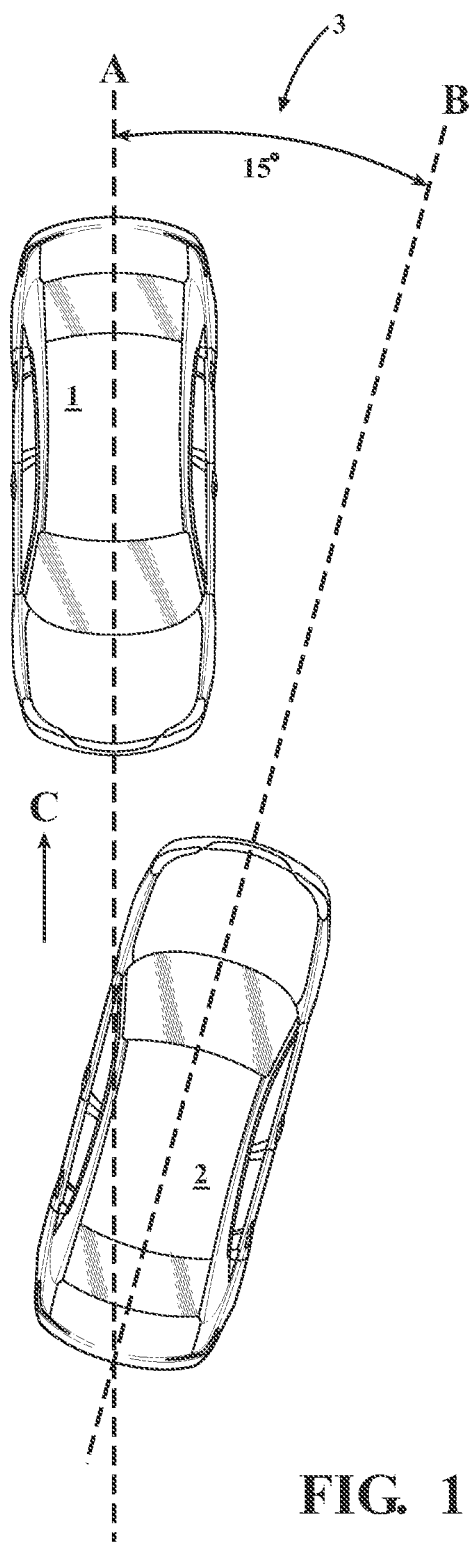
FIG. 1 is a block diagram of first and second vehicles on an oblique impact collision course.

FIG. 1 is a block diagram of first and second vehicles 1, 2 on an oblique impact collision course. As illustrated in FIG. 1, the vehicles 1, 2 will strike each other at an angle 3, defined by longitudinal axes A, B of the vehicles 1, 2, respectively. In the example of FIG. 1, the angle 3 is 15 degrees, which is an angle used in an oblique impact test mode of the National Highway Transportation and Safety Administration (NHTSA). Accordingly, when the vehicle 2 strikes the vehicle 1, a passenger seated in the vehicle 2 will be moved in a direction at an angle to the axis B of the vehicle 2. For example, the passenger could move in a general direction of the arrow C; the direction of the passenger's movement being determined by a variety of known factors, such as speed, angle of impact, center of gravity of the vehicles 1, 2, etc. In this scenario, a passenger seated in the vehicle 2 may experience head rotation, and more severe head injury that would have been experienced in a head-on collision, e.g., measured by a Brain Injury Criterion (BrIC) score, such as is known.

Figure 2:
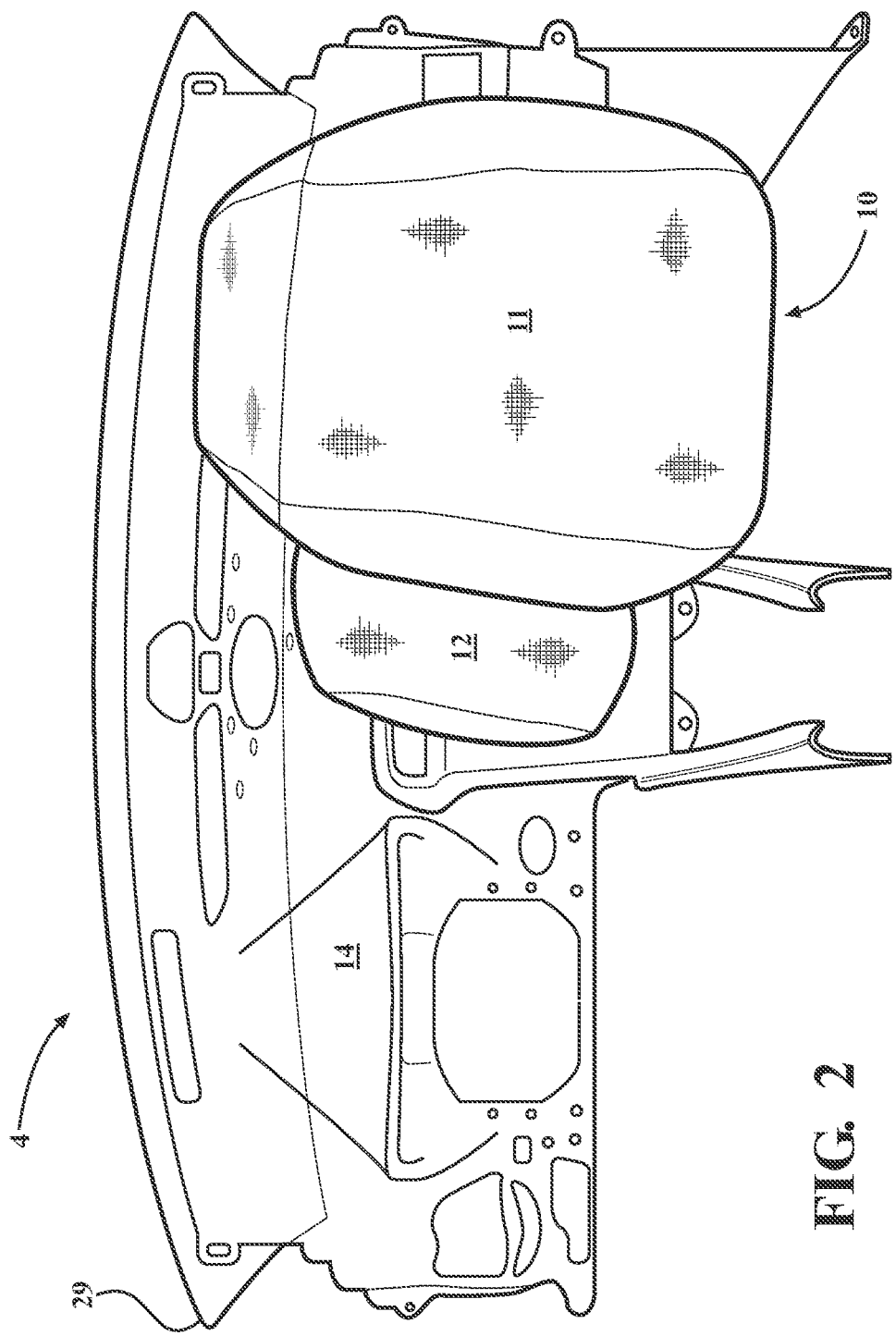
FIG. 2 is a perspective view of a vehicle portion including a passenger airbag having a primary chamber and a secondary chamber.

FIG. 2 is a top perspective view of a vehicle portion 4. The vehicle portion 4 includes a passenger airbag 10 having a primary chamber 11 and a secondary chamber 12, the airbag 10 being shown in an inflated state after having been deployed from a vehicle dash panel 14. The airbag 10 is generally constructed from conventional materials, and may be deployed in a conventional manner, including as described below.

As can be seen in FIG. 2, and as is further illustrated below, the secondary chamber 12 is positioned to mitigate a tendency of a vehicle occupant's head to roll or rotate upon an oblique impact. That is, although the airbag 10 is shown on a passenger's side of a vehicle (assuming a left-hand drive), and the secondary chamber 12 is thus located to the left of the primary chamber 11, to thereby mitigate head rotation in a direction toward the secondary chamber 12. Alternatively or additionally, the secondary chamber 12 could be located to the right of the primary chamber 11. For example, to protect the front passenger if the passenger side is the struck side such as vehicle 1 in FIG. 1, or in countries where a passenger's side of a vehicle is on the left rather than the right, it could be desirable to place the secondary chamber 12 to the right of the primary chamber 11. Further, it is possible to include two or more secondary chambers 12 affixed to the primary chamber 11, e.g., one to the left as shown in FIG. 2, and another to the right.

Figure 5:
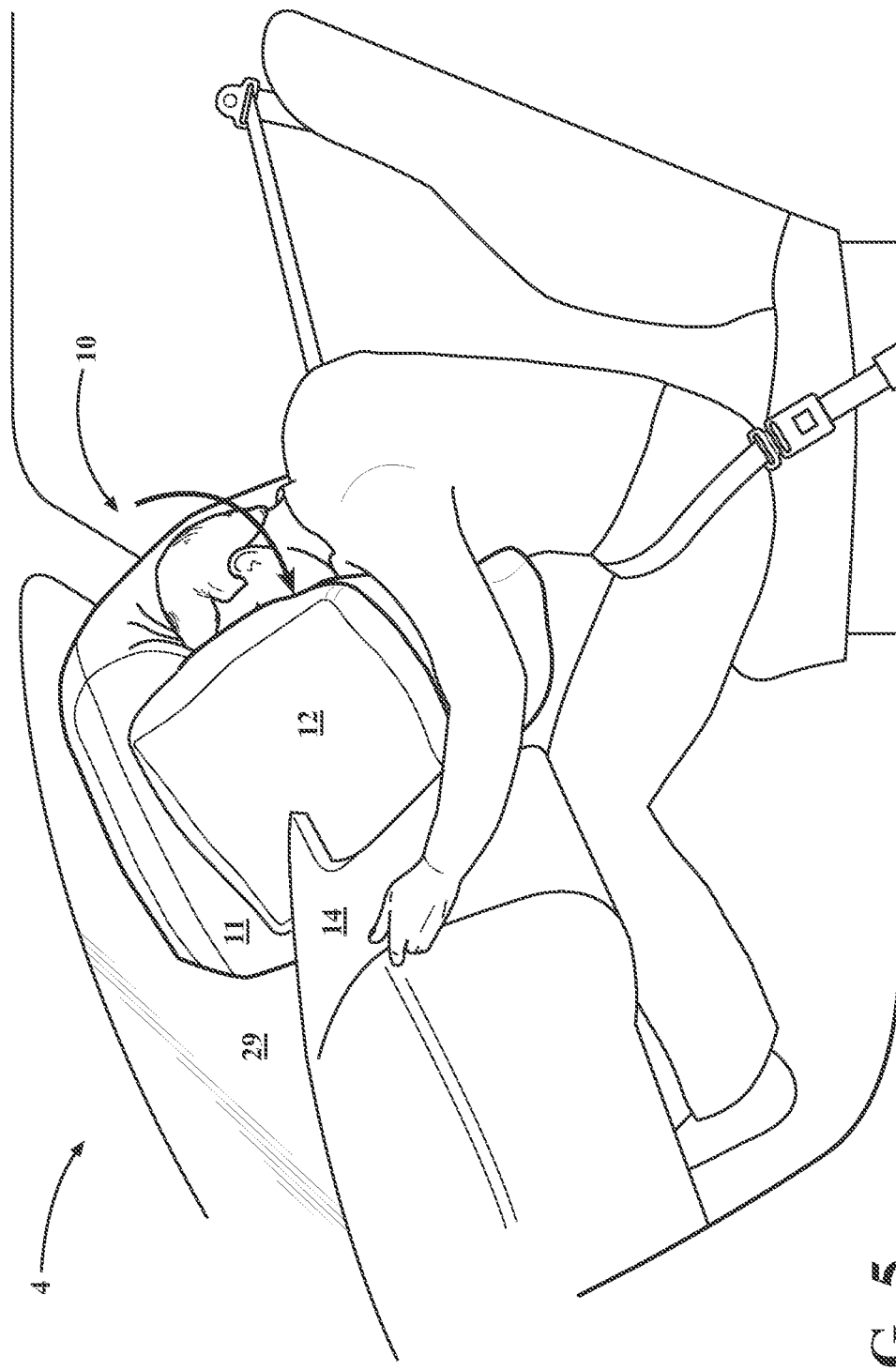
FIG. 5 is a perspective view of a vehicle portion including a passenger airbag having a primary chamber and a secondary chamber.
Figure 6A:
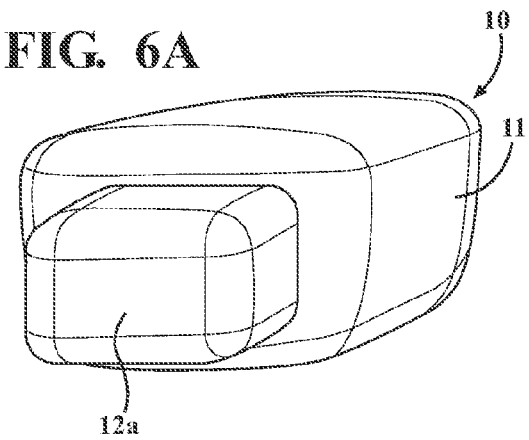
Figure 6B:
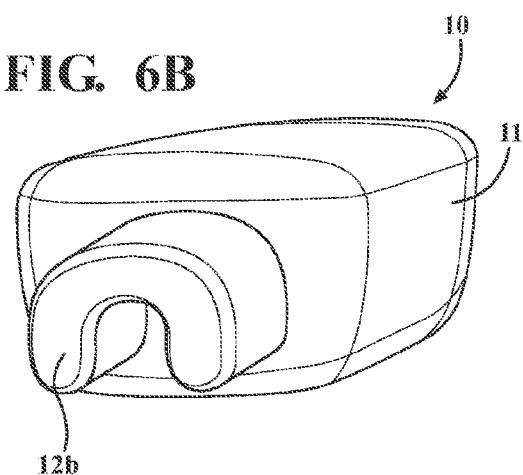
Figure 6C:
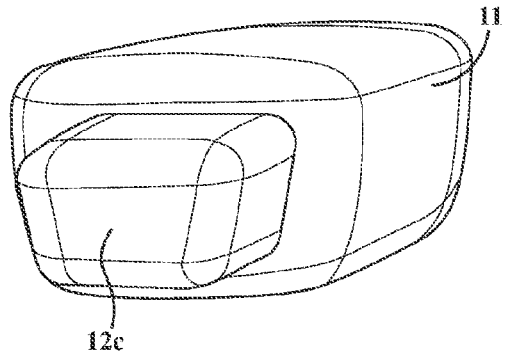
Figure 6D:
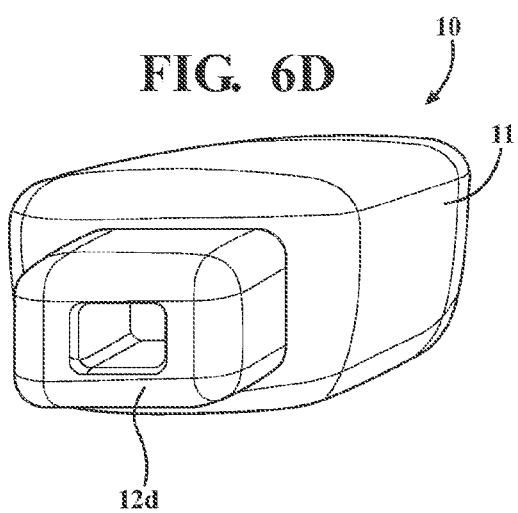
Figure 6E:
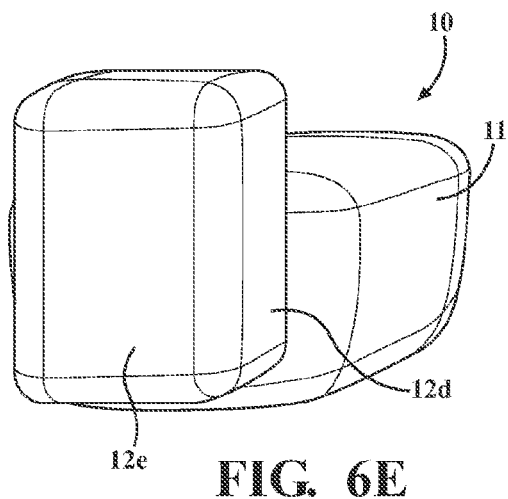

As best seen in FIG. 5, and also illustrated in FIG. 2, the primary chamber 11 contacts first and second reaction surface when the airbag 10 is inflated. That is, the primary chamber 11 contacts the dash or instrument panel 14, as well as a vehicle windshield 29, when the airbag 10 is inflated. The secondary chamber 12, in contrast, contacts only one reaction surface when the airbag 10 is inflated, e.g., the instrument panel 14.

Figure 3:
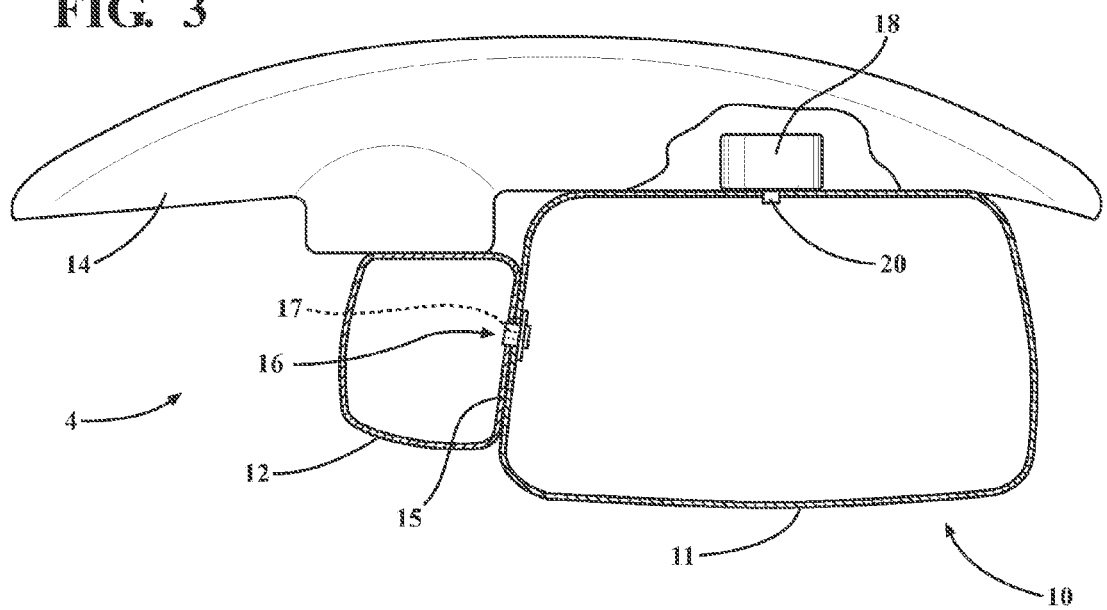
FIG. 3 is a top cross-sectional view of a vehicle portion including a passenger airbag having a primary chamber and a secondary chamber.

FIG. 3 is a top cross-sectional view of a vehicle portion 4 including a passenger airbag 10 in an inflated state. The airbag 10 includes a primary chamber 11 and a secondary chamber 12. The vehicle dash 14 has disposed therein an inflator 18, such as is known. As is further known, inflator 18, upon a triggering event, e.g., a collision, being detected by an airbag controller (not shown), may inflate the airbag 10 via an inflator valve 20.

FIG. 3 further illustrates passage 16 between the primary chamber 11 and the secondary chamber 12. For example, the secondary chamber 12 may be affixed to the primary chamber 11 using conventional mechanisms, e.g., sewn, glued, bonded, etc., wherein a wall 15 may be defined between the primary chamber 11 and the secondary chamber 12, and further wherein an opening may be left in a seam connecting the primary and secondary chambers 11, 12 to create the passage 16. Alternatively or additionally, the passage 16 may include an opening having disposed therein a one-way valve 17 or the like to allow gases to travel from the primary chamber 11 to the secondary chamber 12 upon an event such as a collision triggering inflation of the airbag 10. Although the passage 16 is shown as rectangular in FIG. 3, often it is circular, and/or the valve 17 may be omitted, as seen in FIGS. 7A and 7B.

FIG. 7A is a perspective view of an exemplary airbag 10, illustrating an exemplary mechanism for affixing the secondary chamber 12 to the primary chamber 11. Specifically, in the example of FIG. 7A, the secondary chamber 12 is affixed to a wall 23 of the primary chamber 11 with stitching along a set of seams 19 defined by a perimeter of the secondary chamber 12 affixed to the wall 23.

FIG. 7B is a perspective view of an exemplary airbag 10, illustrating an exemplary mechanism for affixing the secondary chamber 12 to the primary chamber 11. Specifically, in the example of FIG. 7B, similar to the example of FIG. 7A, the secondary chamber 12 is affixed to a wall 23 of the primary chamber 11 with stitching along a set of seams 19. However, because in the exemplary airbag 10 of FIG. 7B (as in the exemplary airbag 10 including a secondary chamber 12e, discussed below with respect to FIG. 6E), the secondary chamber 12 extends to a great height than does the primary chamber 11, the set of seams 19 do not extend all the way around a perimeter of a side of the secondary chamber 12. Instead, some of the seams 19 define a portion of the perimeter of a side of the secondary chamber 12 attached to the wall 23. A remaining subset of one or more of the seams 19 generally coincide with a top edge 24 of the wall 23, the edge 24 being where the secondary chamber 12 is joined to the wall 23 of the primary chamber 11.

The size of an opening in the passage 16, and/or a rate at which the passage 16, including possibly the one-way valve 17 therein, is configured to allow gases to move from the primary chamber 11 to the secondary chamber 12, may depend on a variety of factors. For example, the airbag 10 may vary in size and configuration depending on a type and/or size of vehicle in which it is installed. Further, an airbag controller could be configured to control a valve in the passage 16 depending on various conditions. For example, the valve 17 could be opened if an oblique impact was detected, but left closed, i.e., such that the secondary chamber would not inflate, if a direct frontal or head-on collision was detected. Likewise, control of a valve 17 could depend on other crash modes, e.g., the valve 17 could be configured to open in an offset deformable barrier (ODB) crash mode used in crash testing.

Yet further, a degree to which a valve 17 is open could depend on a detected or predicted angle of the oblique impact. For example, where an angle of impact is greater, e.g., greater than 15 degrees, greater than 30 degrees, etc., it may be desirable to open the valve 17 all the way, or to a greater degree, because in this scenario it would be desirable for the secondary chamber 12 to be relatively stiff or firm compared to the primary chamber 11. That is, a stiffness or firmness of the secondary chamber 12 may be configured to accommodate a predicted angle of impact and consequently likely head rotation of a vehicle passenger. In general, so that a configuration of the passage 16 may control inflation, stiffness, firmness, etc. of the secondary chamber 12, the secondary chamber 12 is not vented or provided with openings or passageways other than the passage 16. The primary chamber 11, on the other hand, may be vented in a conventional manner.

Figure 4:
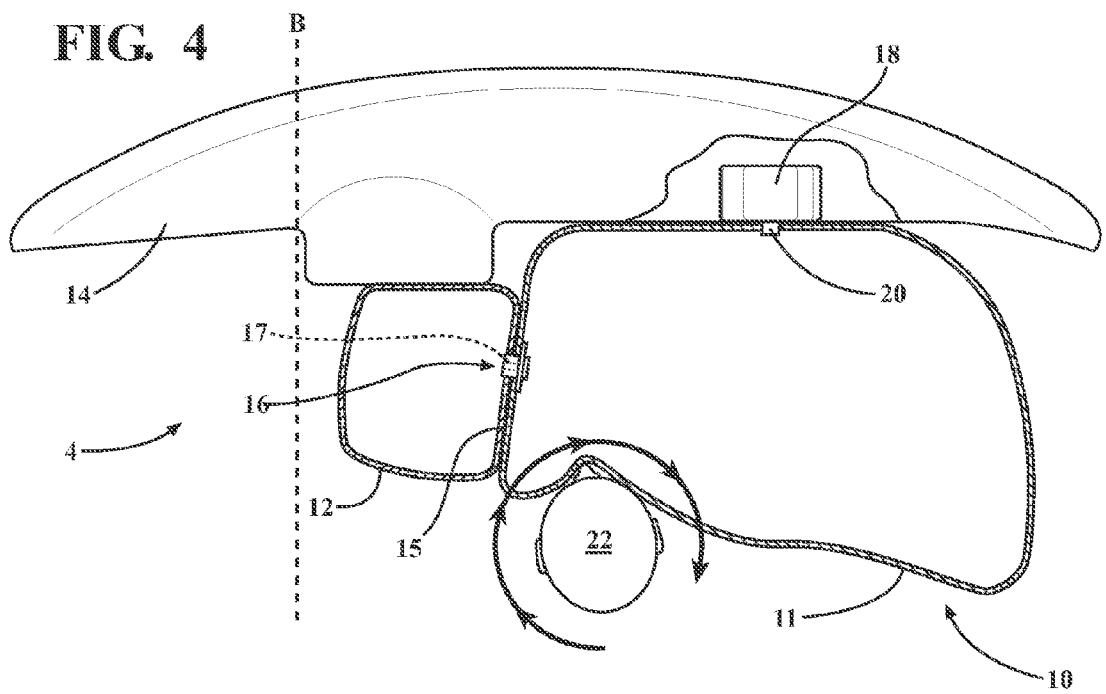
FIG. 4 is a further top cross-sectional view of a vehicle portion 4 including a passenger airbag having a primary chamber and a secondary chamber, showing a human head striking the airbag upon an oblique impact.

FIG. 4 is a further top cross-sectional view of a vehicle portion 4 including a passenger airbag 10 having a primary chamber 11 and a second chamber 12, showing a human head 22 striking the airbag 10 upon an oblique impact. As shown by the arrow around the circle representing the head 22, upon an oblique impact, i.e., at an angle to a vehicle axis B, the head 22 is likely to rotate in a clockwise direction as a passenger is moved at an angle to the axis B. To mitigate such rotation, the secondary chamber 12 is provided. Further, the secondary chamber 12 may be deployed with a greater firmness than the primary chamber 11 to further minimize rotation of the passenger head 22.

FIG. 5 is a side perspective view of a vehicle portion 4 including a passenger airbag 10 having a primary chamber 11 and a secondary chamber 12. As with FIG. 4, an arrow is provided to show a direction of rotation of the head 22 of a vehicle passenger upon an oblique impact to the vehicle. As can again be seen, the secondary chamber 12 of the airbag 10 provides a barrier to reduce rotation of the passenger head 22, such barrier not being provided by the airbag 10 with the primary chamber 11 alone.

FIGS. 10-12C illustrate a further possible arrangement of the chambers 11, 12 to form the airbag 10, in which the secondary chamber 12 is partially affixed or attached to the secondary chamber 11 such that a gap 30 is provided between respective portions of the primary chamber 11 and the secondary chamber 12. As mentioned above, the chambers 11, 12 may be joined at a seam by being glued, bonded, sewn, etc.; in this example, the seam 19 extends partially, but not completely, around a perimeter of the secondary chamber 12; also, the seam 19 may or may not also extend partially, but does not extend completely, around a perimeter of the primary chamber 11. In any case, the seam 19 may include an inner side 33 that also borders the gap 30, whereby a side or edge of the gap 30 is defined by the side 33 of the seam 19. As should be clear from the foregoing, the seam 19 generally defines a closed shape, i.e., the seam 19 is generally a contiguous perimeter of some shape, e.g., a square, rectangle, trapezoid, oval, etc., or some approximation of the following, or of an irregular shape. Further, although the seam 19 is shown in FIGS. 12A-12C as larger than, and surrounding, the opening 16, in the implementation of an airbag 10 with a partially attached secondary chamber 12 now being described, it is to be noted that the opening 16 and the seam 19 could be partly or entirely co-extensive, that is, the seam 19 could define some or all or the boundaries of the opening 19.

As can be seen in FIGS. 12A-12C, the seam 19 in this example generally surrounds the passage 16, and defines sides or boundaries of the common wall 15 between the chambers 11, 12. Accordingly, note that the term "gap" as used herein refers simply to facing portions of the chambers 11, 12 that do not share the common wall 15. That is, the gap 30 is shown in FIGS. 10 and 11 as providing a space between the chambers 11 and 12 for ease of illustration. However, in practice, walls of the chambers 11, 12 on either side of the gap 30 may touch each other, e.g., as shown in FIGS. 12A-12C. As further seen in FIGS. 12A-12C, an area 35 where the gap 30 may be located, with respect to a wall of the primary chamber 11, and with respect to a wall of the secondary chamber 12, is defined by an area 35 outside a perimeter of the seam 19 where the wall 23 of the primary chamber 11 overlaps a wall 32 of the secondary chamber 12. For example, the area 35 may be defined by portions of two sides of the wall 32 (i.e., by sides of the secondary chamber 12), by the seam 19 side 33, and by an edge 37 at which an overlap of the primary chamber wall 23 and the secondary chamber wall 32 terminates.

In other words, for an area bounded by, i.e., having as its perimeter, the seam 19 including the side 33, the wall 23 serves as a common wall between the primary chamber 11 and the secondary chamber 12. For the area 35, however, the wall 23 of the primary chamber 11 is not shared with, i.e., is not common to or part of, the secondary chamber 12. Instead, the area 35 is defined on the wall 32 of the secondary chamber, the walls 23 and 32 overlapping at the area 35, and forming the gap 30. Accordingly, the inner side 33 of the seam 19 is located between or interior to, i.e., not at or near ("near" in this context meaning within two centimeters), an edge of either the wall 23 or an edge of the wall 32. In general, the inner side 33 is located with respect to whichever of the walls 23 or 32 has a lesser height (or with respect to either of them if the walls 23, 32 have substantially a same height). Further, the inner side 33 may be substantially or roughly parallel to the edge 37, and a location of the inner side 33 may be somewhere between the edge 37 and a halfway point of a distance from the edge 37 to an edge, generally parallel to the edge 37, of one of the walls 23 or 32.

FIGS. 6A-6E respectively provide perspective views of exemplary secondary chambers 12. Although the secondary chamber 12 has been shown as generally having the shape of a rectangular solid in the preceding illustrations, e.g., in a shape reflected by the secondary chamber 12a shown in FIG. 6, other shapes may be used depending on various factors, so long as the secondary chamber 12 is configured to contact a single reaction surface, e.g., the instrument panel 14, when an impact is detected, whereas the primary chamber 11 is configured to contact at least two reaction surfaces when an impact is detected, e.g., the instrument panel 14 and windshield 29. For example, it is generally desirable to reduce the size and weight of components included in a vehicle, including airbags and airbag components. Accordingly, the secondary chamber 12 may be generally U-shaped, as reflected in the exemplary secondary chamber 12b, generally trapezoidal or roughly triangular as reflected in the secondary chamber 12c, and/or could include an opening as shown with respect to the secondary chamber 12d. Further, the secondary chamber 12 may be generally rectangular or oblong as illustrated by the secondary chamber 12e, where the chamber 12 has at least a length or height greater than a corresponding length or height of the primary chamber 11, e.g., an end of the chamber 12 extends beyond, e.g., is higher than, the primary chamber 11.

FIG. 8 provides a graph showing respective BrIC scores comparison for airbags 10 with and without a secondary chamber 12 according to a simulation. As can be seen, the use of an airbag 10 including a primary chamber 11 and also a secondary chamber 12 results in a roughly 30 percent improvement in reduced BrIC score for the vehicle passenger compared to the use of an airbag 10 having a conventional design, i.e., including a primary chamber 11, but not a secondary chamber 12 as disclosed herein, in a simulation of an oblique impact in a vehicle.

FIG. 14 provides a graph showing respective BrIC scores for airbags 10 without a secondary chamber 12, with a secondary chamber 12 that is fully attached, and with a secondary chamber 12 that is partially attached. As can be seen, the use of an airbag 10 including a primary chamber 11 and also a partially attached secondary chamber 12 results in a roughly 37 percent improvement in reduced BrIC score for the vehicle passenger compared to the use of an airbag 10 having a conventional design, i.e., including a primary chamber 11, but not a partially attached secondary chamber 12 as disclosed herein, in a simulation of an oblique impact in a vehicle.

A further illustration of benefits of the presently disclosed airbag 10 is provided in FIG. 9, which includes two series of block diagrams representing times-series simulations of a human head 22 striking an airbag 10. A top set of simulations shows a head 22 striking an airbag having only a primary chamber 11 at a series of times following an impact, i.e., 52, 60, 66, 70, and 74 milliseconds, respectively. A bottom set of simulations shows a head 22 striking and airbag 10 having a primary chamber 11 but also a secondary chamber 12 at the same series of times following an impact. As can be seen, the airbag 10 including the secondary chamber 12 results in less head 22 rotation than the airbag having only a primary chamber 11.

FIG. 13, similar to FIG. 9, includes three series of block diagrams representing times-series simulations of a human head 22 striking an airbag 10 including without a secondary chamber 12 ("BASELINE"), with a primary chamber 11 and a secondary chamber 12 ("PAB w/Secondary Chamber"), and with a primary chamber 11 and a partially attached secondary chamber 12 ("PAB w/Partially Attached Secondary Chamber"). A "BASELINE" set of simulations shows a head 22 striking an airbag having only a primary chamber 11 at a series of times following an impact, i.e., 52, 60, 66, 70, and 74 milliseconds, respectively. A "PAB w/Secondary Chamber" set of simulations shows a head 22 striking and airbag 10 having a primary chamber 11 but also a secondary chamber 12 at the same series of times following an impact. As can be seen, the airbag 10 including the secondary chamber 12 results in less head 22 rotation than the airbag having only a primary chamber 11. Further, a "PAB w/Partially Attached Secondary Chamber" set of simulations shows a head 22 striking and airbag 10 having a primary chamber 11 but also a partially attached secondary chamber 12 at the same series of times following an impact. As can be seen, the airbag 10 including the secondary chamber 12 results in less head 22 rotation than the BASELINE series, and less even than the "PAB w/Secondary Chamber" set of simulations.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A vehicle airbag, comprising:
    a primary chamber;
    a secondary chamber affixed to the primary chamber by a seam;
    a passage between the primary chamber and the secondary chamber, wherein the passage is arranged to provide lateral fluid flow from the primary chamber to the secondary chamber with respect to a longitudinal vehicle axis; and
    wherein the seam defines a closed shape, and joins a wall of the primary chamber to a wall of the secondary chamber;
    wherein the seam includes at least a first side that is not at any edge of the secondary chamber and a second side that is at a first edge of the secondary chamber, whereby the first side of the seam defines an edge of a gap between the wall of the secondary chamber and the wall of the primary chamber.

2. The airbag of claim 1, wherein the seam is at least one of bonded, glued, and sewn.

3. The airbag of claim 1, wherein the primary chamber is configured to contact at least two reaction surfaces, and the secondary chamber is configured to contact one and only one of the at least two reaction surfaces, when the airbag is inflated upon detection of an impact.

4. The airbag of claim 1, further including a one-way valve disposed in the passage, the valve being configured to allow gas to flow from the primary chamber to the secondary chamber, wherein an airbag controller is configured to open the valve upon detecting an oblique impact.

5. The airbag of claim 4, wherein the airbag controller is configured to open the valve to a degree determined to achieve a firmness of the secondary chamber determined according to a detected angle of impact.

6. The airbag of claim 1, wherein a size of the passage is configured to control a firmness of the secondary chamber.

7. The airbag of claim 1, further comprising:
    a second secondary chamber affixed to the first chamber; and
    a second passage between the primary chamber and the second secondary chamber, whereby gas provided to the first chamber by an inflator mechanism may be provided to the second secondary chamber.

8. The airbag of claim 1, wherein the secondary chamber has one of a length and a height greater than a corresponding length or height of the primary chamber.

9. A vehicle airbag, comprising:
    a primary chamber;
    a secondary chamber affixed to the primary chamber by a seam; and
    a passage between the primary chamber and the secondary chamber;
    wherein a first portion of the seam is located at a portion of a perimeter of the secondary chamber and a second portion of the seam has at most a first end and a second end at the perimeter of the secondary chamber;
    wherein the seam includes at least a first side that is not at any edge of the secondary chamber and a second side that is at a first edge of the secondary chamber, whereby the first side of the seam defines an edge of a gap between the wall of the secondary chamber and the wall of the primary chamber; and
    wherein the secondary chamber has one of a length and a height greater than a corresponding length or height of the primary chamber.

10. The airbag of claim 9, wherein the seam is at least one of bonded, glued, and sewn.

11. The airbag of claim 9, wherein the primary chamber is configured to contact at least two reaction surfaces, and the secondary chamber is configured to contact one and only one of the at least two reaction surfaces, when the airbag is inflated upon detection of an impact.

12. The airbag of claim 9, further including a one-way valve disposed in the passage, the valve being configured to allow gas to flow from the primary chamber to the secondary chamber, wherein an airbag controller is configured to open the valve upon detecting an oblique impact.

13. The airbag of claim 12, wherein the airbag controller is configured to open the valve to a degree determined to achieve a firmness of the secondary chamber determined according to a detected angle of impact.

14. The airbag of claim 9, wherein a size of the passage is configured to control a firmness of the secondary chamber.

15. The airbag of claim 9, further comprising:
    a second secondary chamber affixed to the first chamber; and
    a second passage between the primary chamber and the second secondary chamber, whereby gas provided to the first chamber by an inflator mechanism may be provided to the second secondary chamber.

16. The airbag of claim 9, wherein a location of the second portion of the seam is defined at least in part by one of a point between a top edge of the secondary chamber and a point halfway between the top edge of the secondary chamber and a bottom edge of the secondary chamber, and a point between a top edge of the primary chamber and a point halfway between the top edge of the primary chamber and a bottom edge of the primary chamber.

17. A vehicle airbag, comprising:
    a primary chamber;
    a secondary chamber affixed to the primary chamber by a seam;
    a passage between the primary chamber and the secondary chamber, wherein the passage is arranged to provide lateral fluid flow from the primary chamber to the secondary chamber with respect to a longitudinal vehicle axis; and
    a one-way valve disposed in the passage, the valve being configured to allow gas to flow from the primary chamber to the secondary chamber, wherein an airbag controller is configured to open the valve upon detecting an oblique impact;
    wherein the seam defines a closed shape, and joins a wall of the primary chamber to a wall of the secondary chamber.

18. The airbag of claim 17, wherein the seam is at least one of bonded, glued, and sewn.

19. The airbag of claim 17, wherein the primary chamber is configured to contact at least two reaction surfaces, and the secondary chamber is configured to contact one and only one of the at least two reaction surfaces, when the airbag is inflated upon detection of an impact.

20. The airbag of claim 17, wherein the airbag controller is configured to open the valve to a degree determined to achieve a firmness of the secondary chamber determined according to a detected angle of impact.

* * * * *